United States Patent [19]

Colonius et al.

[11] 4,443,927
[45] Apr. 24, 1984

[54] SUCKER ROD MACHINING SYSTEM

[75] Inventors: Ray E. Colonius, Bloomfield Hills; John P. Vederko, Dearborn; Don A. Cargill, Bloomfield Hills, all of Mich.

[73] Assignee: Cargill Detroit Corp., Clawson, Mich.

[21] Appl. No.: 323,966

[22] Filed: Nov. 23, 1981

[51] Int. Cl.³ .............................................. B23Q 7/03
[52] U.S. Cl. ....................................... 29/563; 29/33 P
[58] Field of Search ..................... 29/33 T, 33 P, 563, 29/564, 558

[56] References Cited

U.S. PATENT DOCUMENTS

| | | | |
|---|---|---|---|
| 2,028,008 | 1/1936 | Peyinghaus | 29/33 P |
| 2,559,369 | 7/1951 | Phillips | 29/33 P |
| 2,895,354 | 7/1959 | Hawkinson et al. | 29/33 P X |
| 3,961,703 | 6/1976 | McKeever | 29/563 X |

FOREIGN PATENT DOCUMENTS

| | | | |
|---|---|---|---|
| 1171554 | 1/1959 | France | 29/33 P |
| 2420405 | 11/1979 | France | 29/563 |
| 52-34485 | 3/1977 | Japan | 29/33 P |
| 56-116644 | 9/1981 | Japan | 29/33 P |

OTHER PUBLICATIONS

Article "Hitachi Transfer Machine", Machinery Nov. 9, 1960, vol. 97, pp. 1052-1056.

Primary Examiner—William R. Briggs

[57] ABSTRACT

A machining system for oil well sucker rods wherein the rod end to be machined is held in a non-rotating fixture rigidly without release throughout rough machining, finish machining and roll threading operations including a conveyor system for transporting fixtures with rods to successive stations for performing successive operations.

9 Claims, 29 Drawing Figures

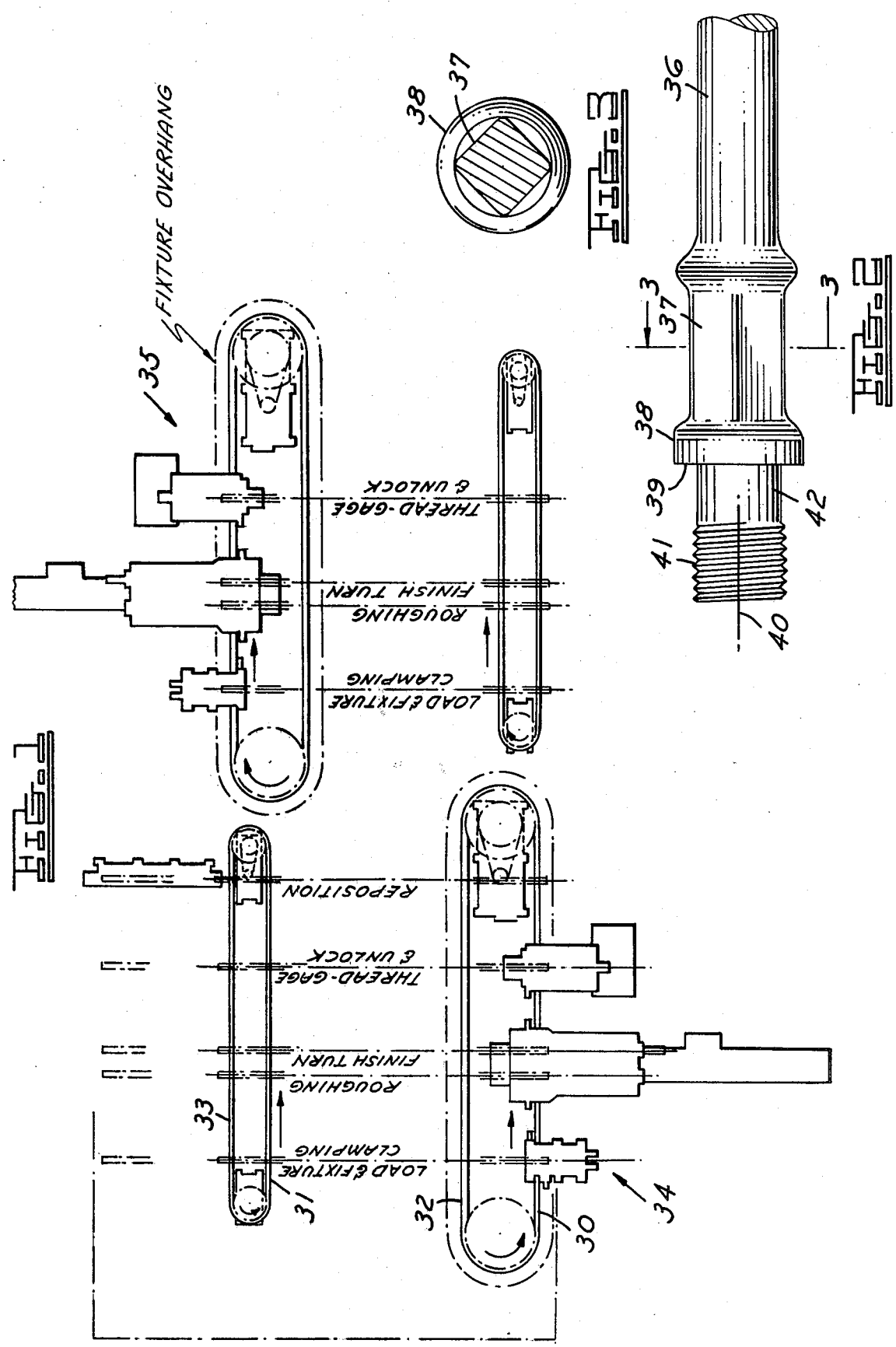

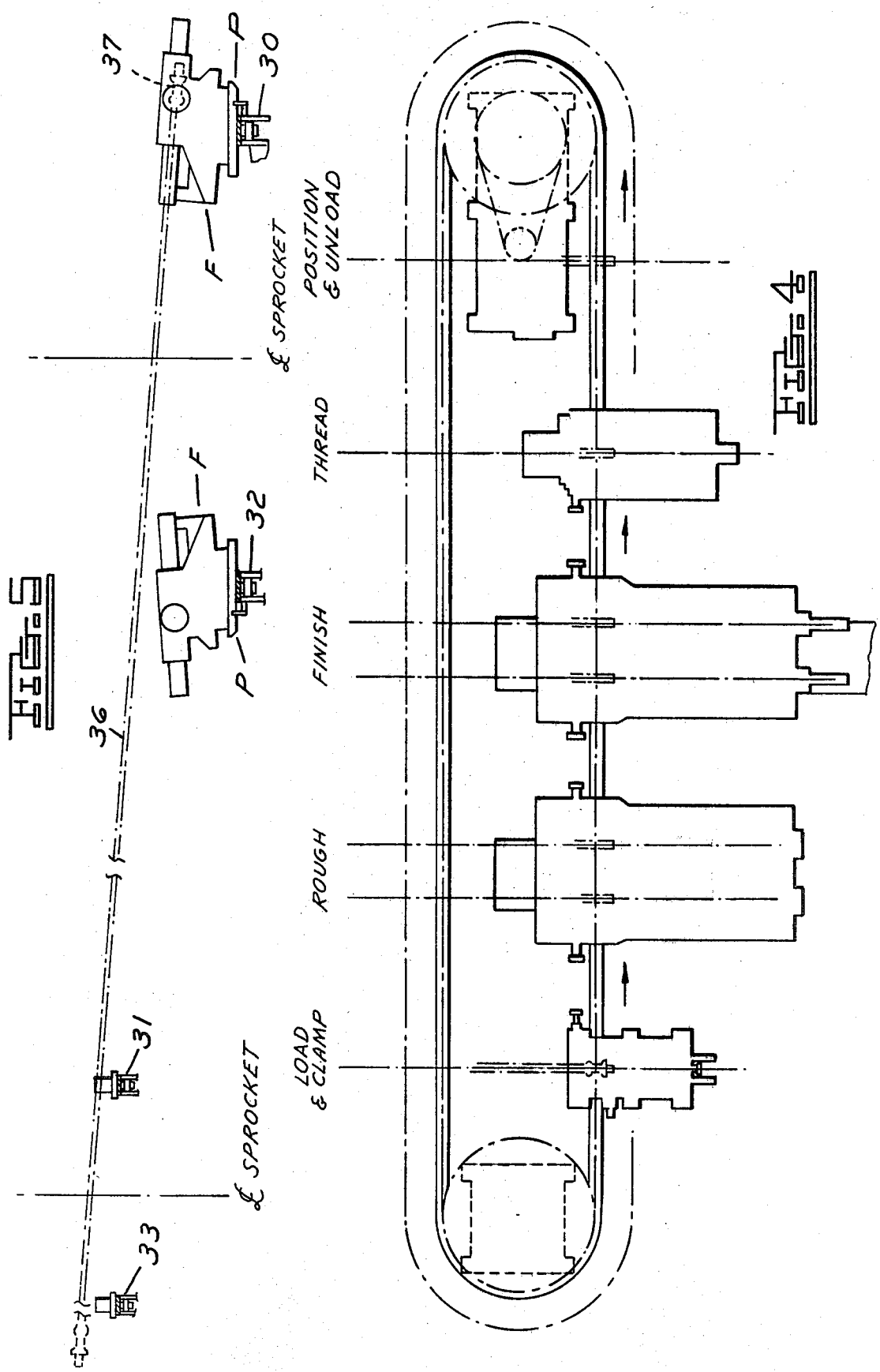

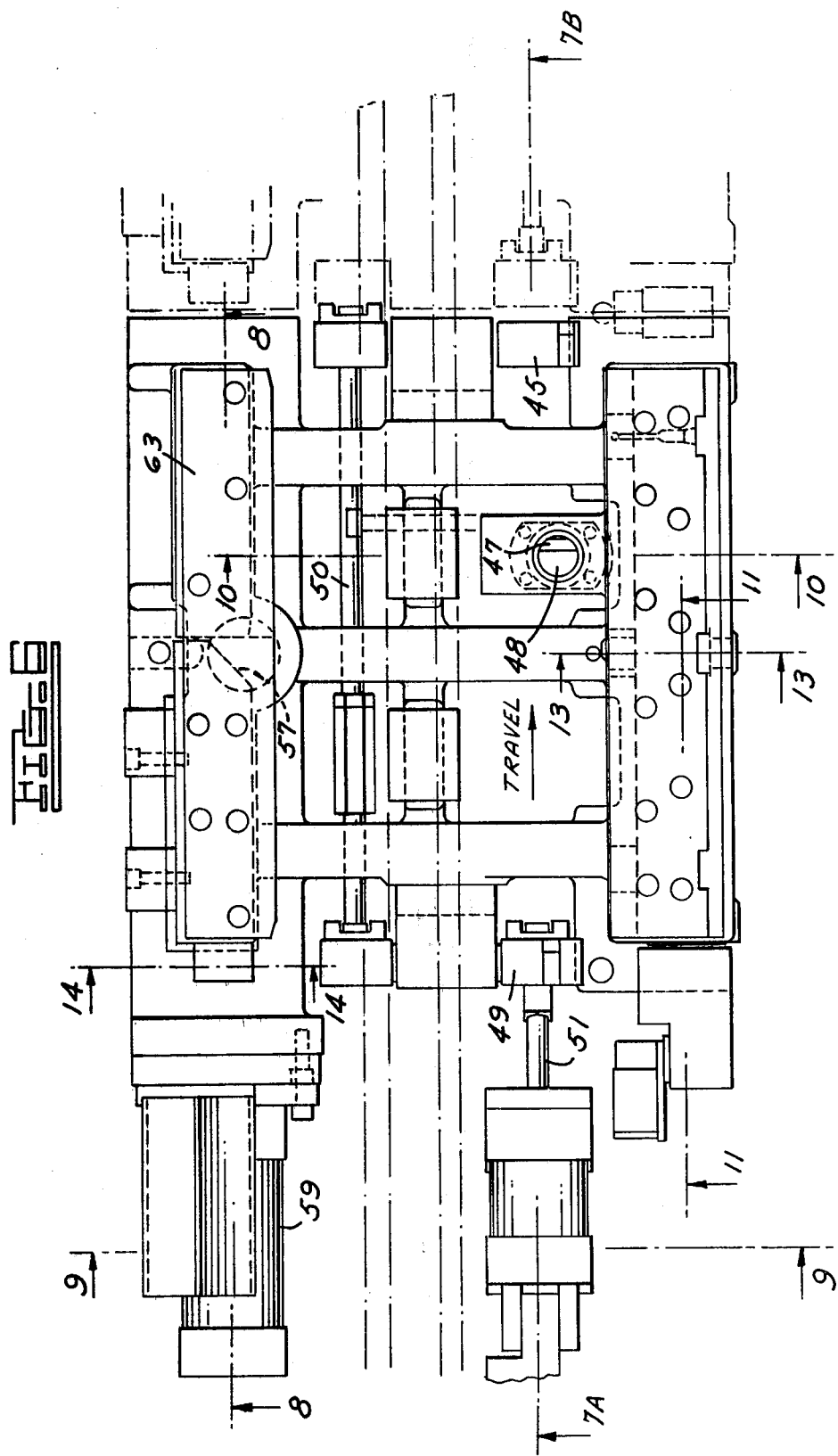

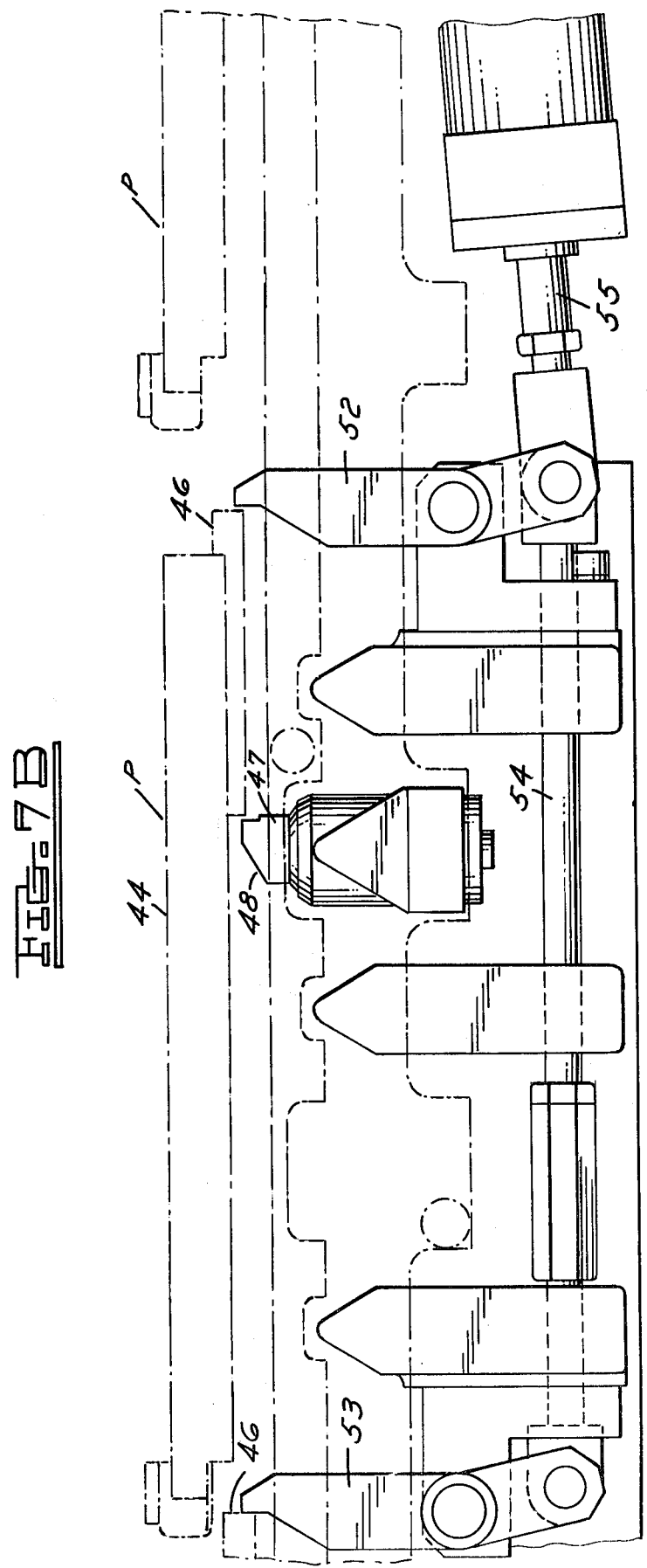

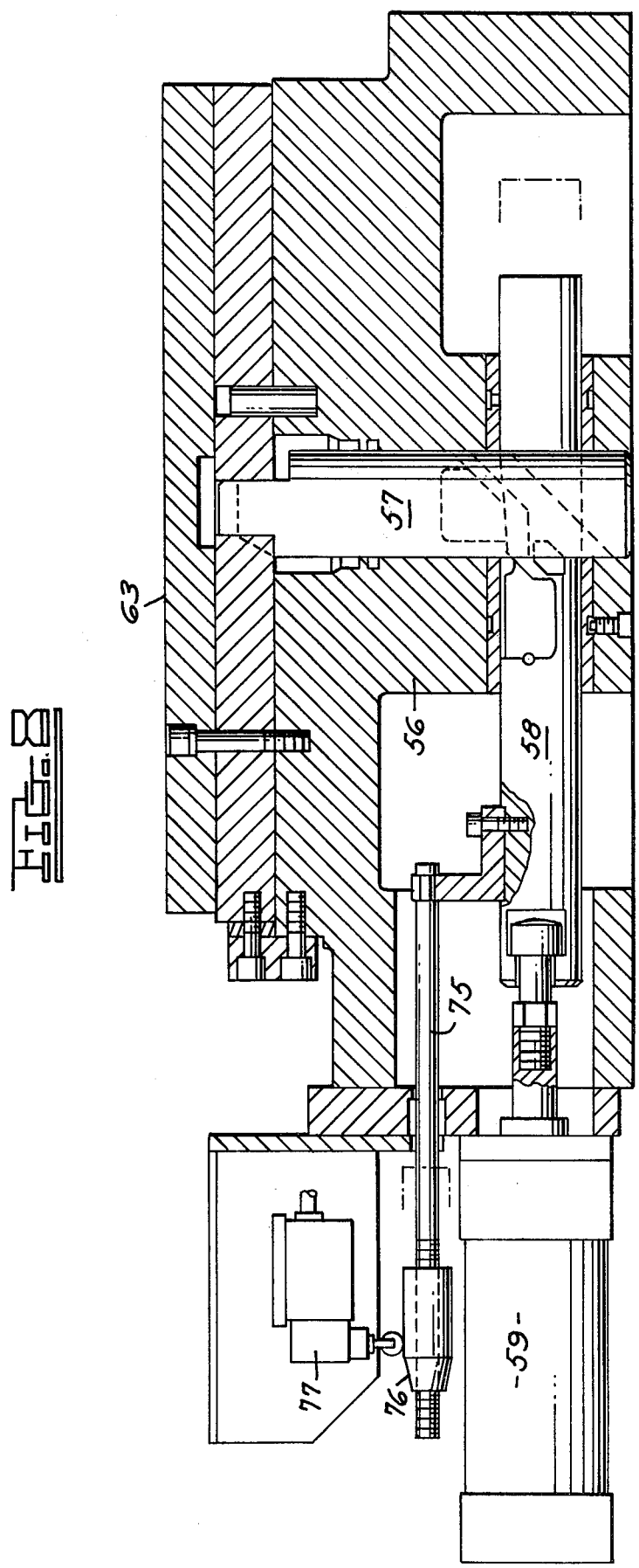

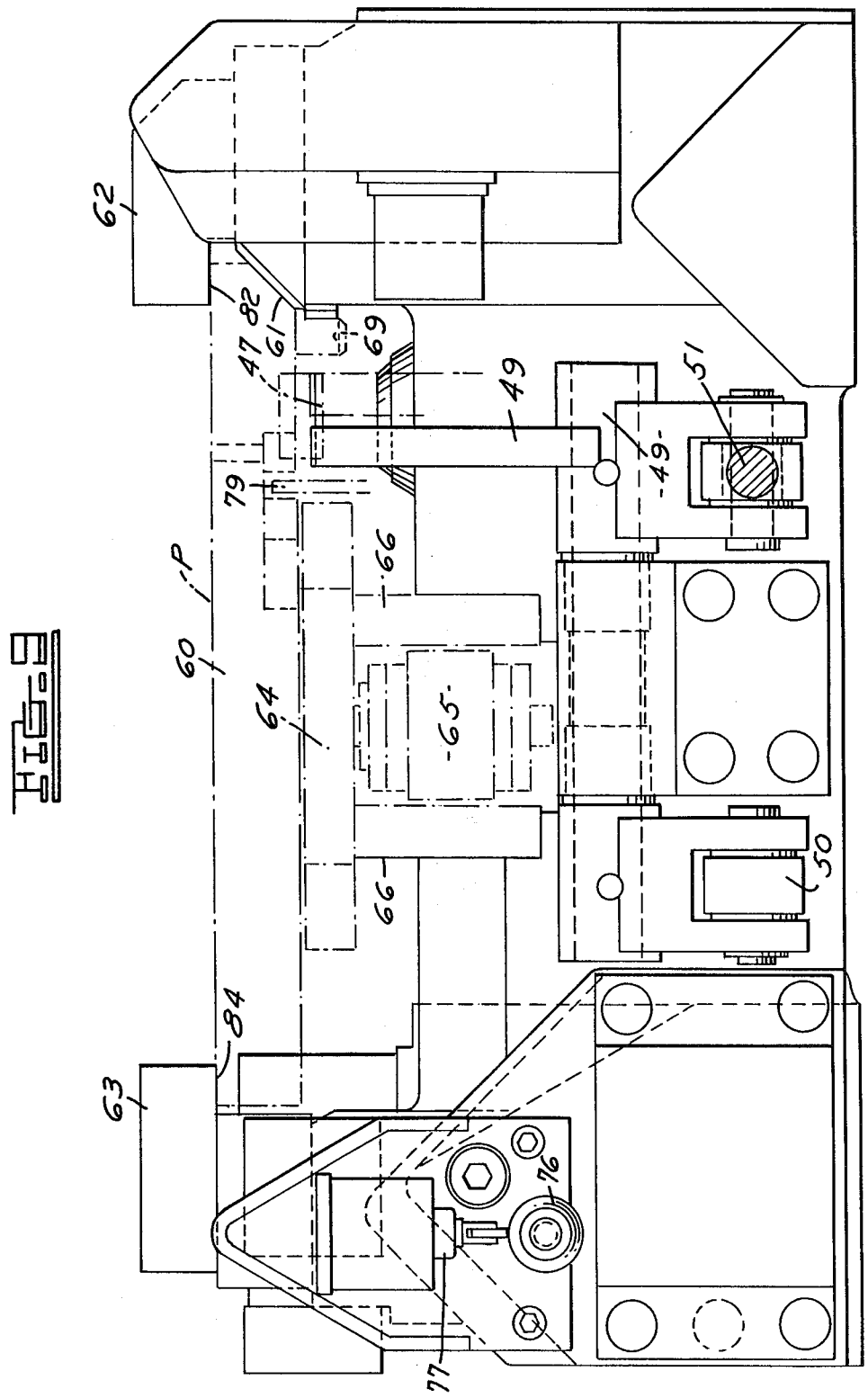

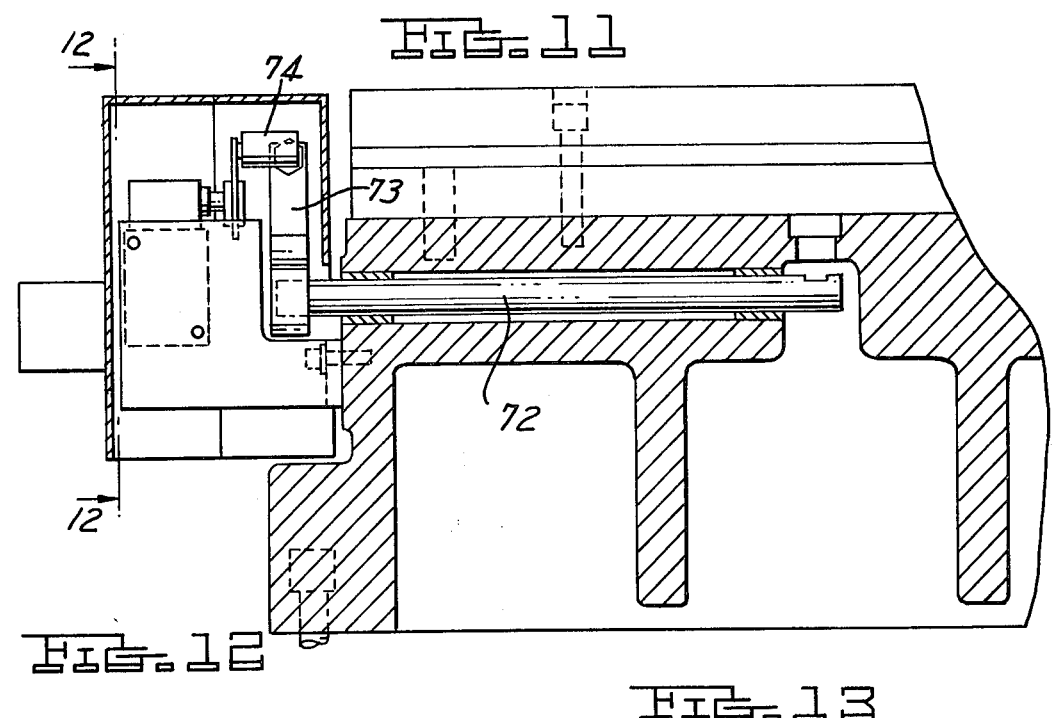
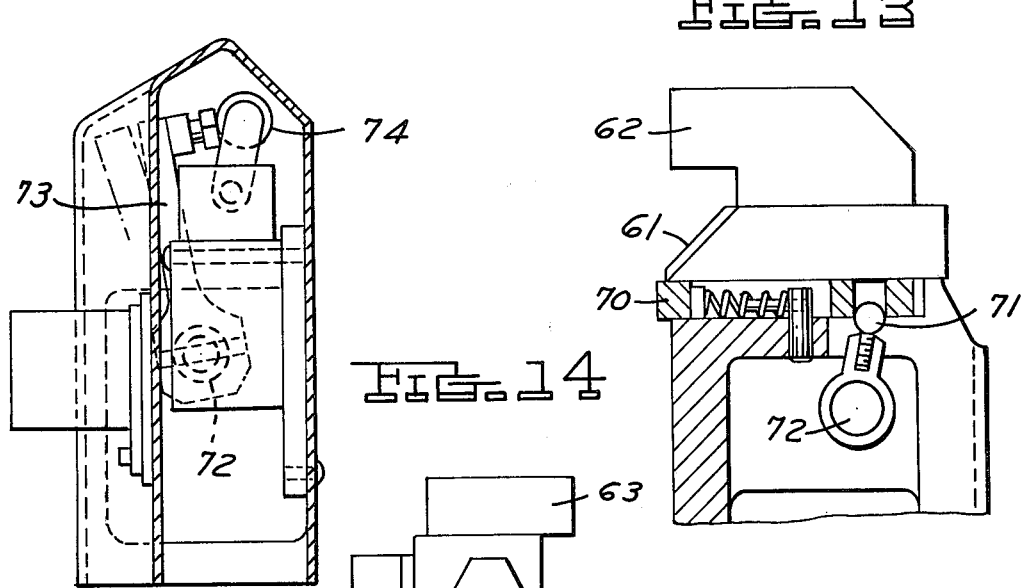
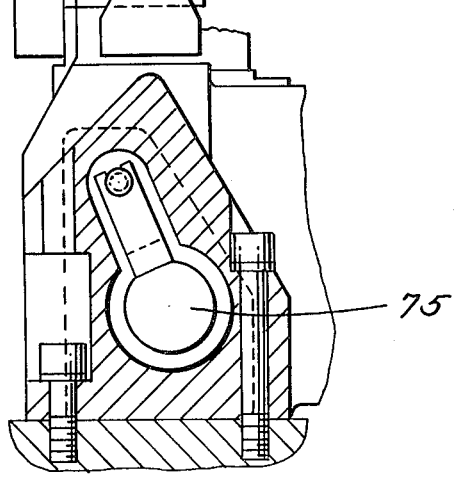

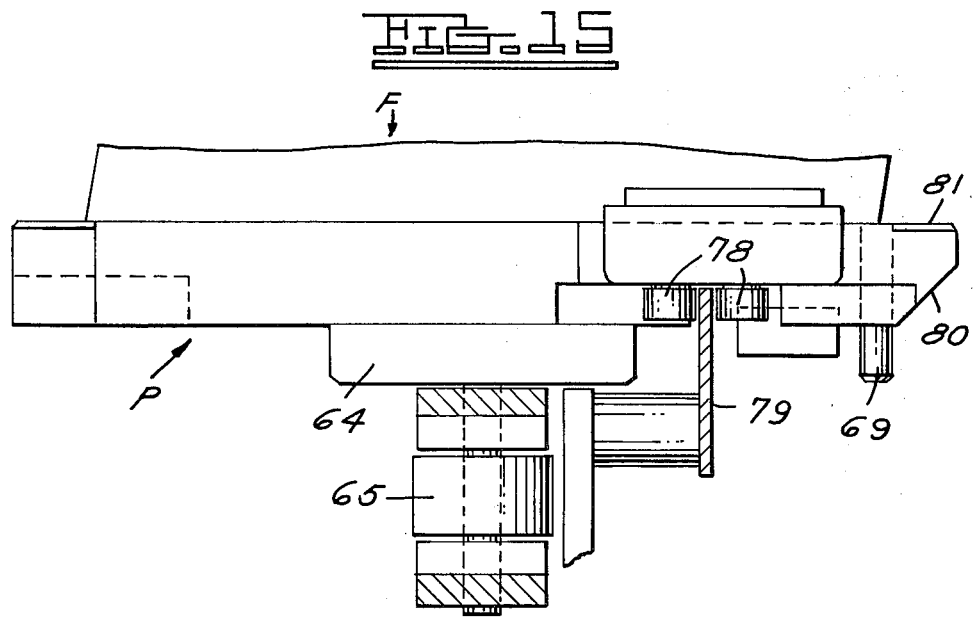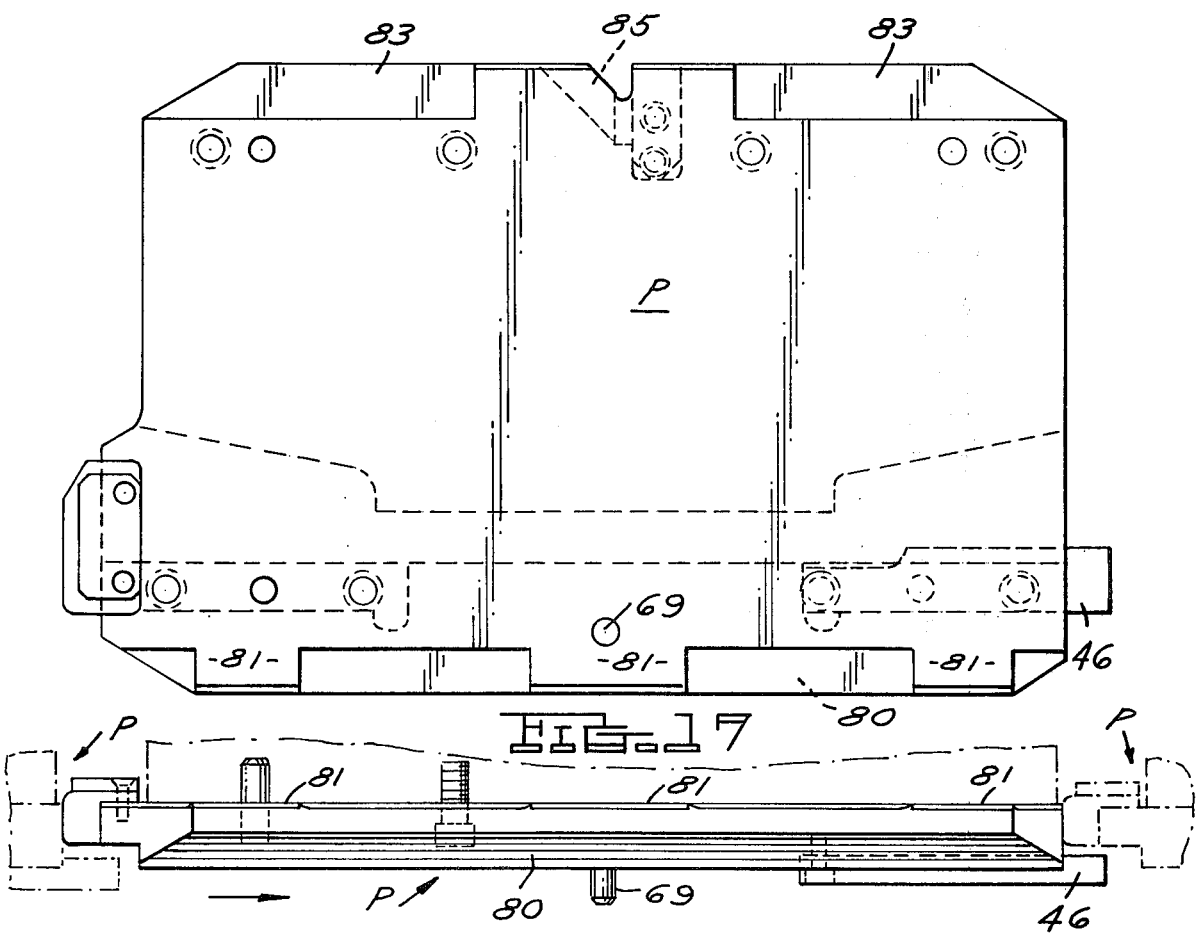

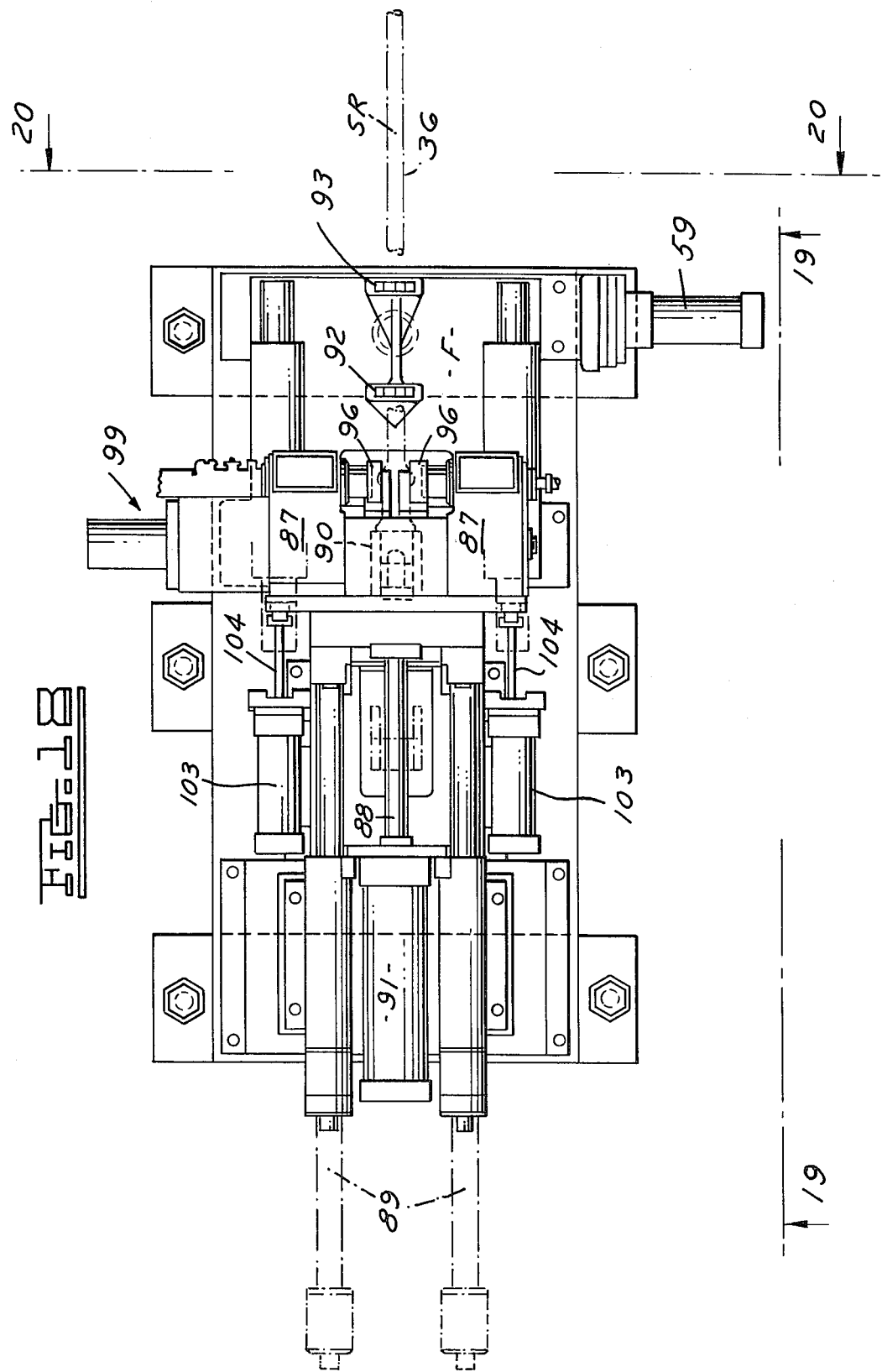

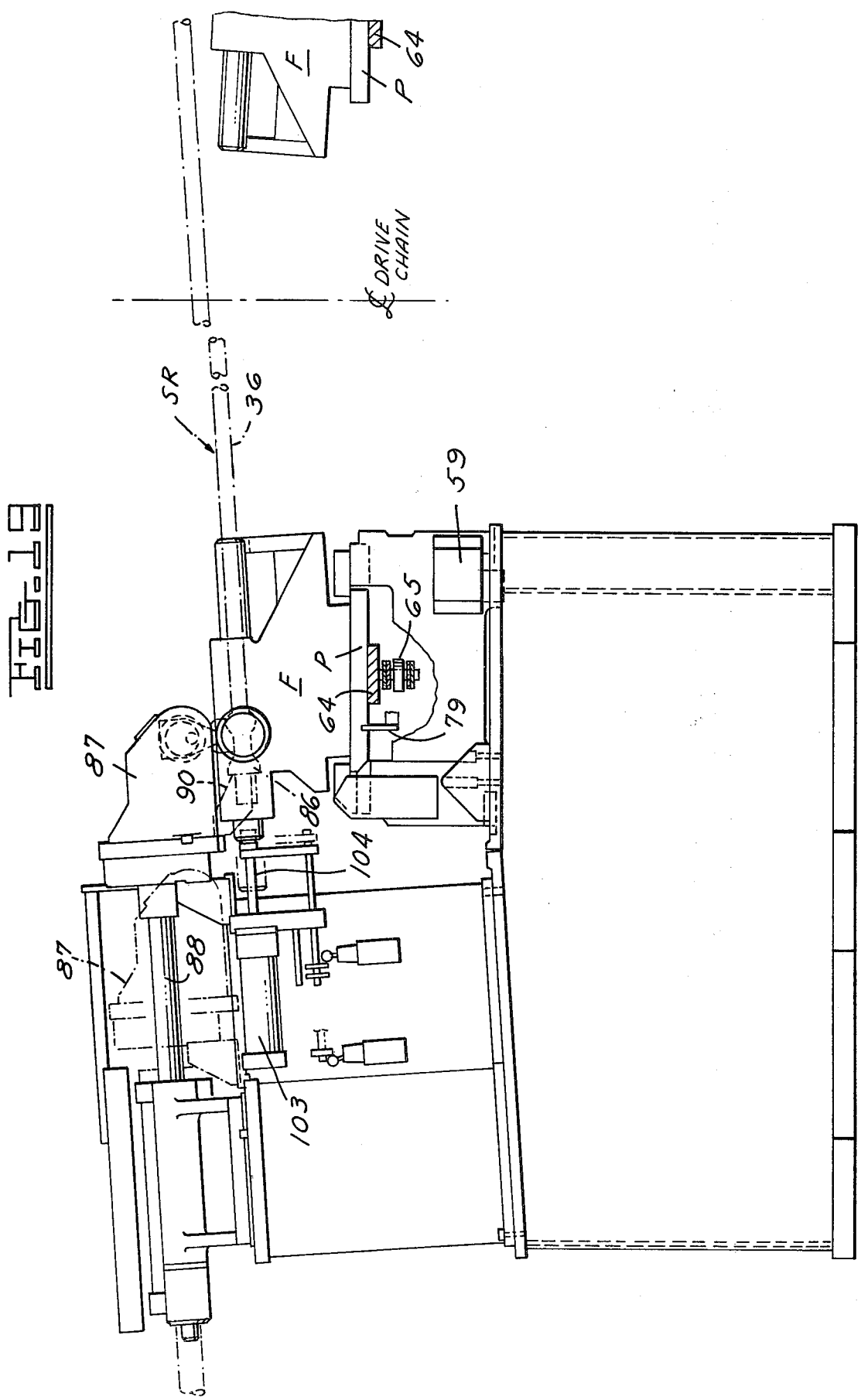

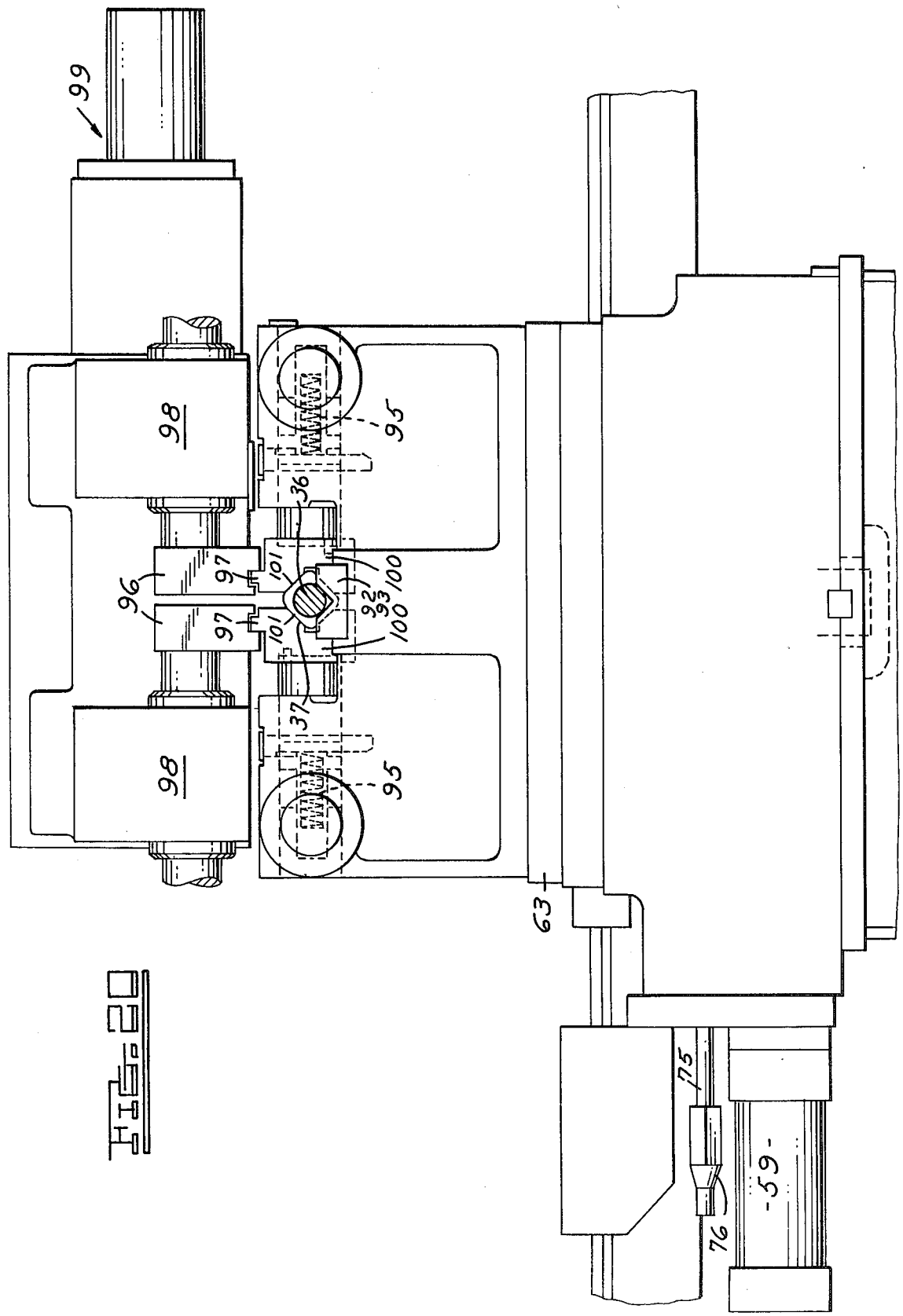

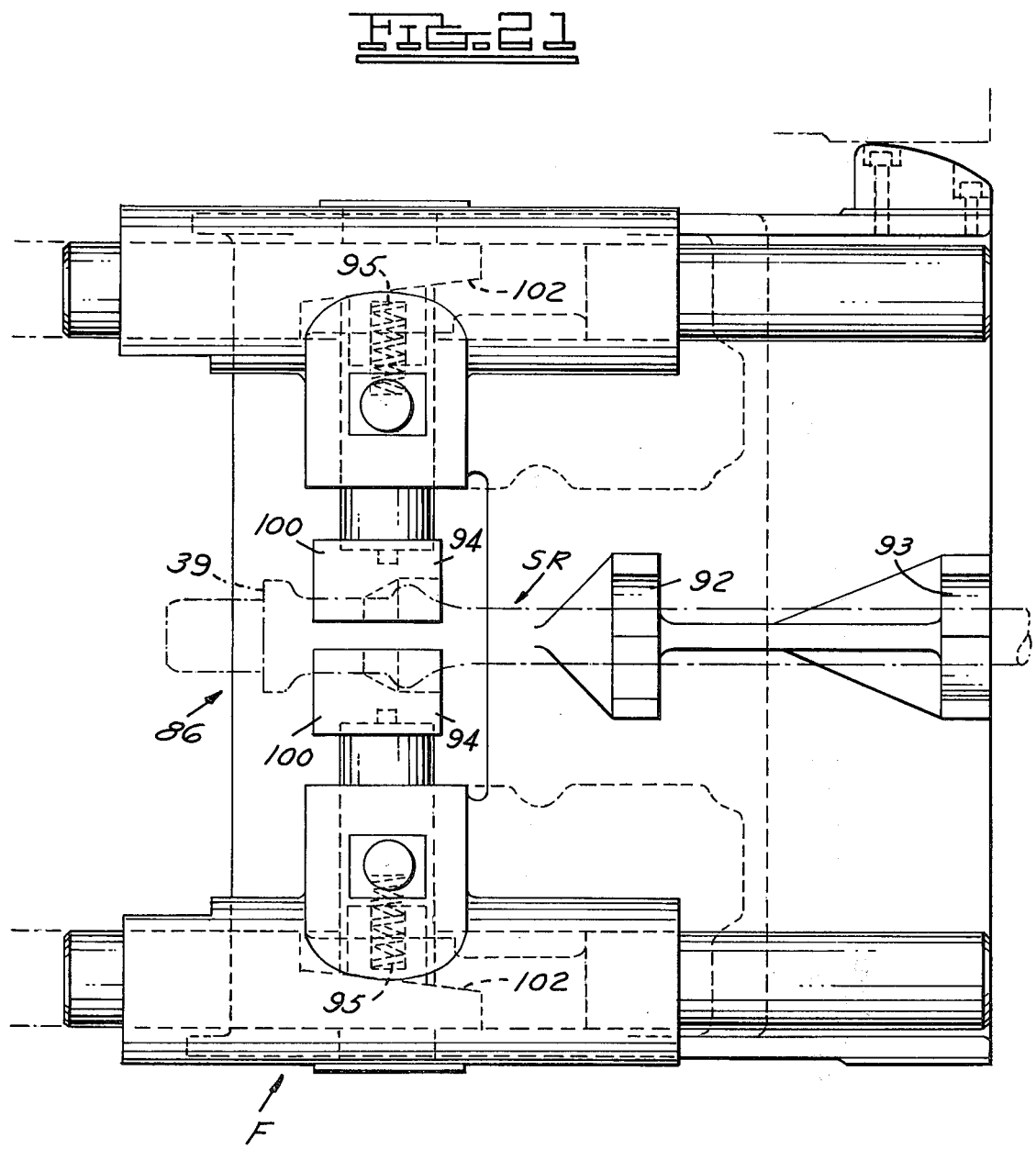

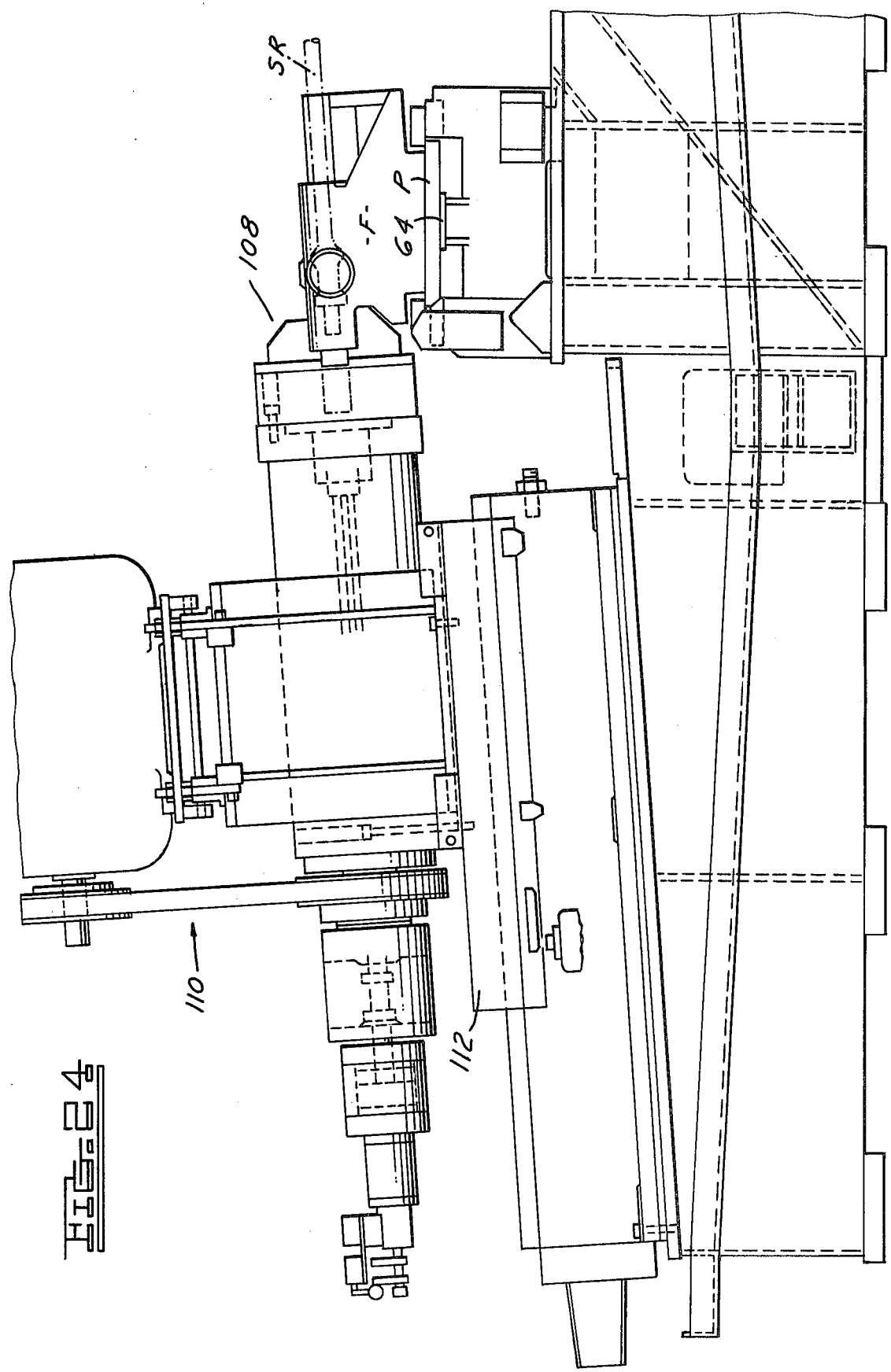

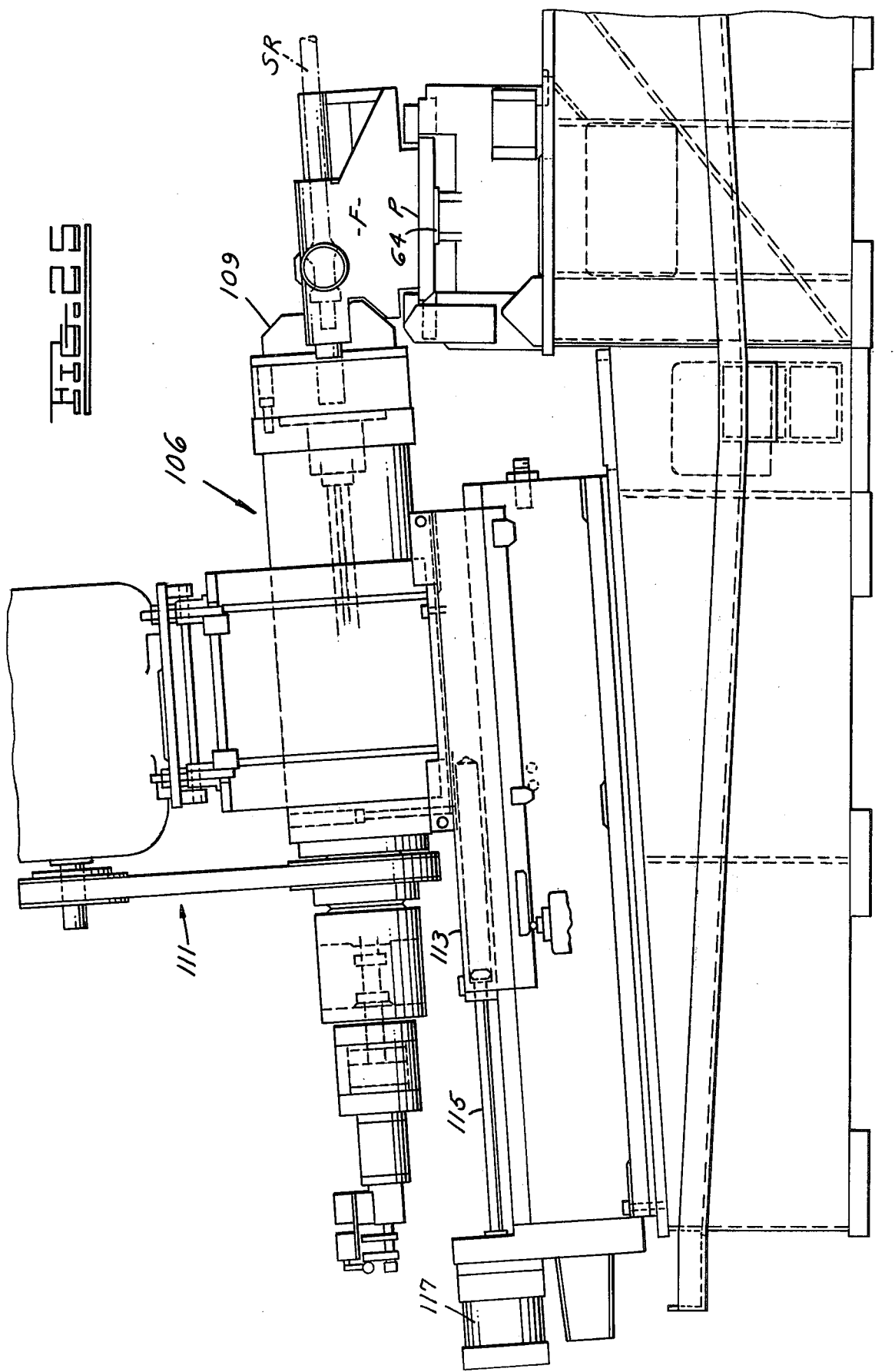

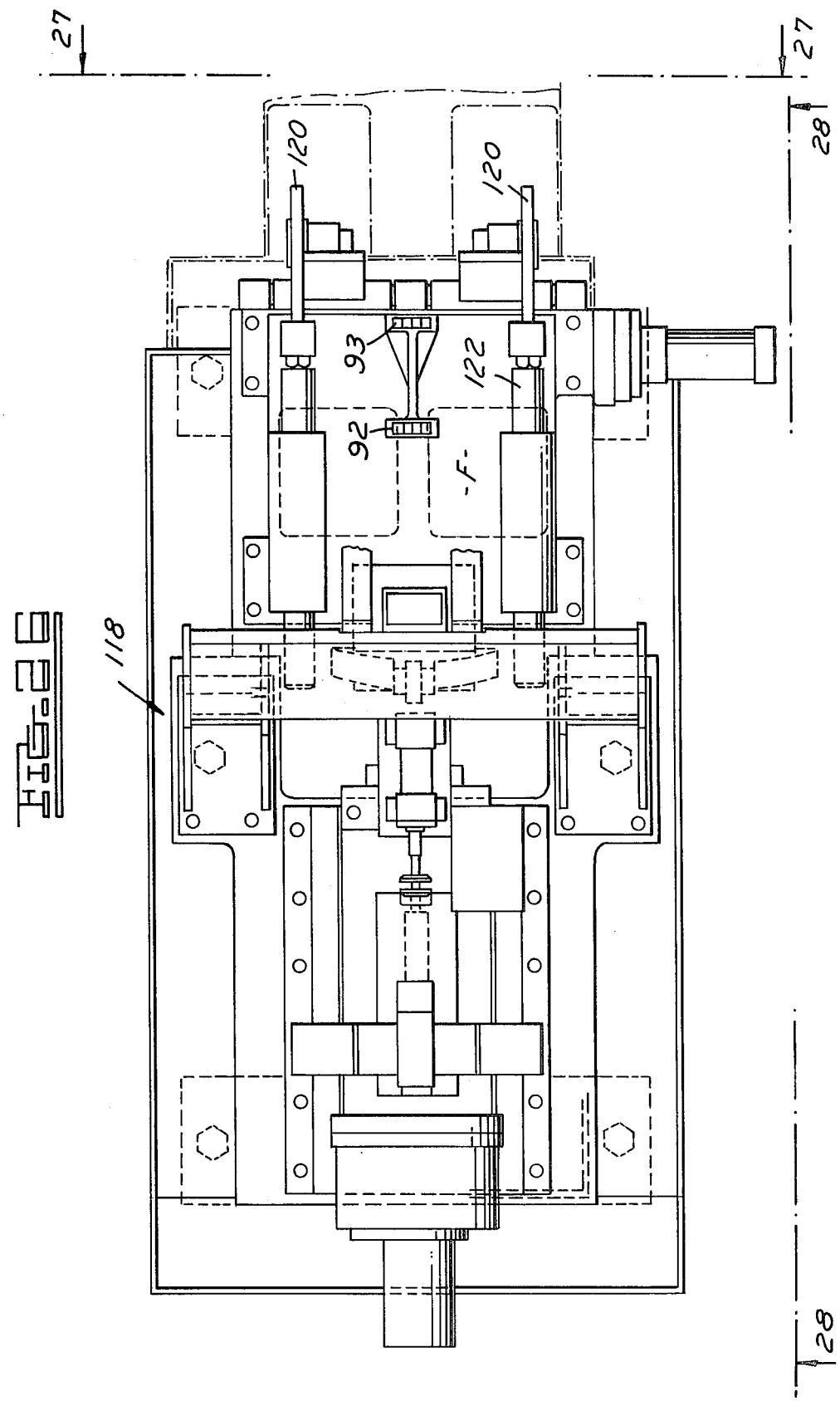

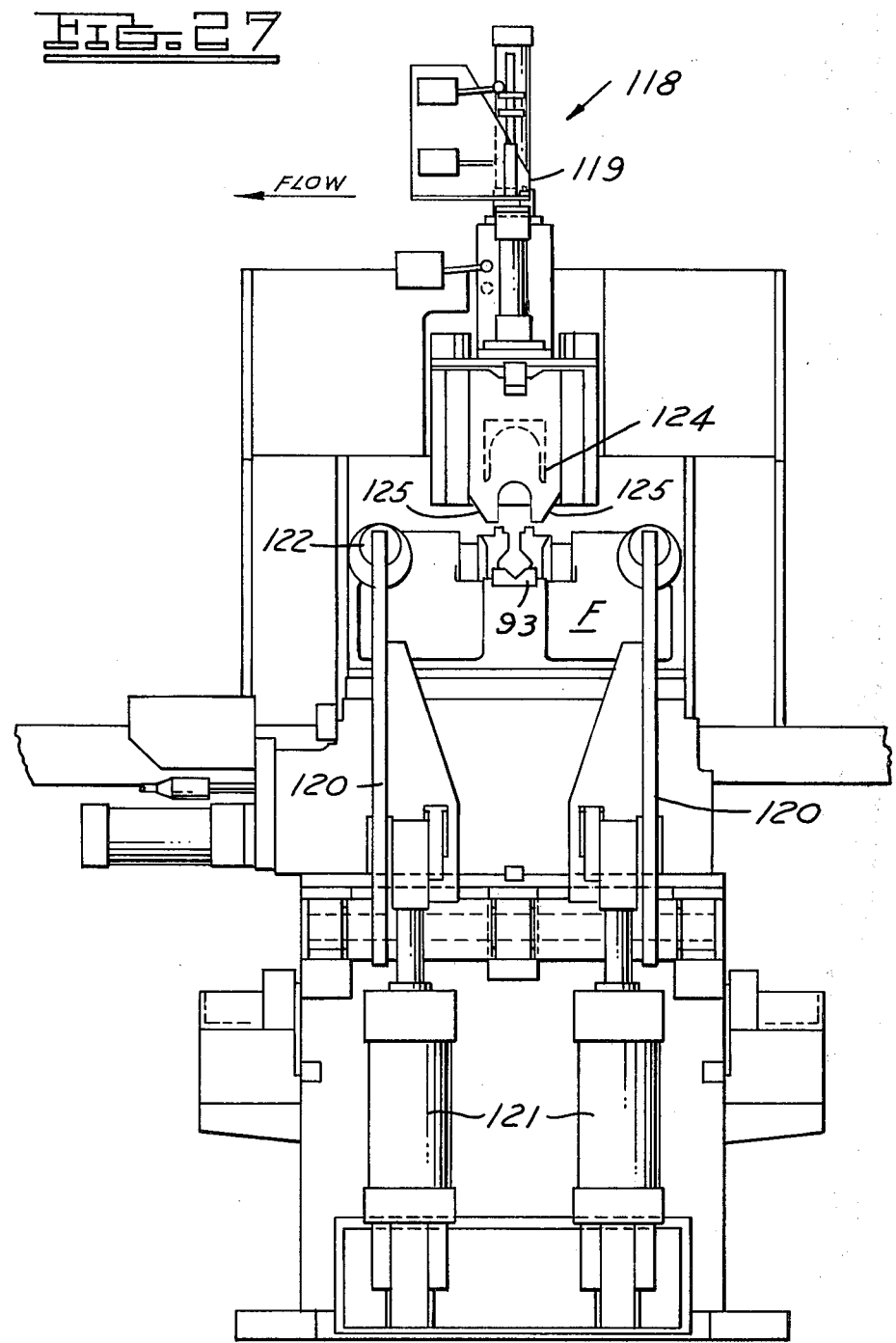

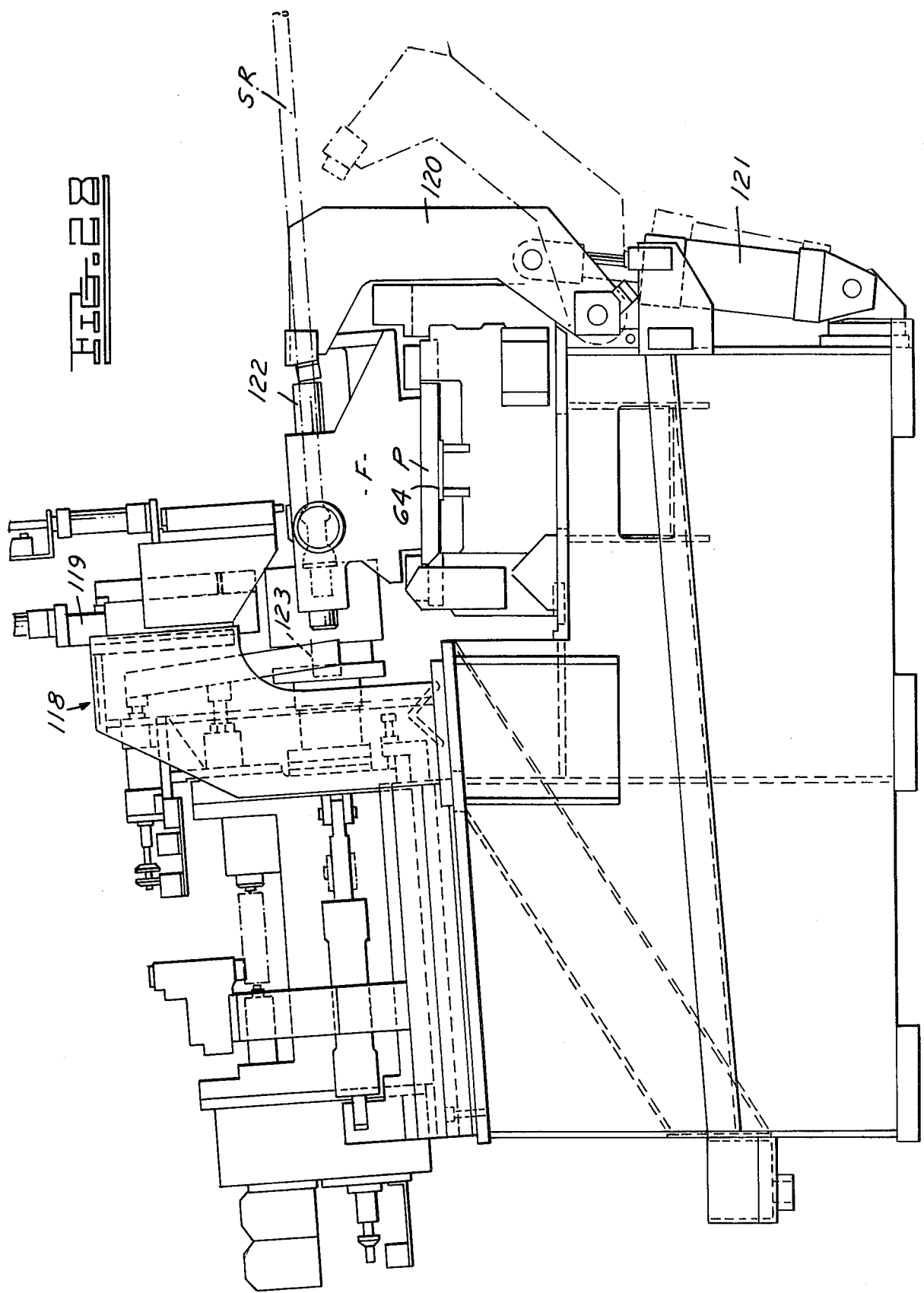

SUCKER ROD MACHINING SYSTEM

BACKGROUND OF THE INVENTION

In machining the threaded coupling ends of sucker rods which are employed in pumping oil from deep wells, e.g. sometimes extending to depths as great as 14,000 feet; extreme precision is required to assure pumping operation under the high tensile loads involved without any possibility of "working" at the coupling joints which might cause failure and separation within the well. Precision threads axially normal to shoulder engaging surfaces of the rod ends for press fit machining with end surfaces of couplings free of any radial plane angularity which could limit full contacting engagement of adjacent coupling surfaces is a critical requirement.

Conventional prior art systems for machining the ends of sucker rods have employed typical barstock machines with rotating rod and stationary tooling techniques. Rotary indexing heads hold the tooling for successive operations on rod lengths in the range of 23 to 30 feet and rod diameters in the range of $\frac{5}{8}''$ to $1\frac{1}{8}''$.

Limitations in the speed and accuracy of performing the required successive operations led to the development of an alternative "unwrapped" system wherein each rod is transported horizontally to successive stations at each of which the rod is axially moved to a shoulder gauge stop and clamped against rotation whereupon rotating tooling performs the required operation. While such system has proved commercially successful in improving productivity and accuracy over the prior conventional rotating rod machining method, the requirement for clamping, unclamping and relocating the axial position of the bar at each station has failed to achieve the total benefits of the present system wherein the bar end is clamped and retained in a single accurately located fixturized pallet throughout all operations.

Thus, in clamping and releasing at each station, initial axial registration of the rod takes place against a forged shoulder surface followed by lateral clamping and removal of the axial gauge to provide access for rough machining the shoulder. Due to variations in forgings, clamp release of the rod for transport between stations, possible different rotational orientation at successive stations, possible rebound from the axial gauge surface, and other potentials for mislocation, maximum precision in relative inter-station location of the rods has involved practical tolerances in the order of plus or minus 0.020" even in the absence of any malfunction of the locating tooling. Furthermore, occasionally where workpiece variations cause gross mislocations, substandard machining out of tolerance may result in an undesirable percentage of scrapped sucker rods.

SUMMARY OF THE PRESENT INVENTION

By developing the present system of rigid fixturized clamping of the sucker rod end in a precision fixturized pallet which is transported from station to station and rigidly clamped in precise orientation relative to the operational tooling at each station without ever releasing the rod from its fixture between stations, a marked improvement in accuracy of inter-station locations, and dependability of meeting all tolerance requirements as well as increased productivity has been obtained. For example, locating tolerances within plus or minus 0.005" are readily and reliably obtained with minimized possibility for any scrapped rods.

The preferred transport system involves a pair of continuously running horizontal chain conveyors for frictional drive of fixturized pallets at one rod end and like drive of tailstock carriers at the other which respectively register against lateral retractable stops aligned with the respective stations. Clamping within the fixture takes place on a square rod section behind all surfaces to be machined so that precision pallet registration with a fixed axial stop and complete rigidly clamped orientation of locating pallet surfaces at each station can assure dependable inter-station fixture location without any loss of workpiece orientation within the fixture throughout all sequential machining operations.

In the preferred system for maximum productivity a rod locating and fixture clamping station is followed by a pair of rough machining stations, a pair of finish machining stations, and a single thread rolling station in order to take advantage of the relatively shorter cycle time for thread rolling. Also, in order to provide a through horizontal system for complete machining of both ends without requirement for rotating the sucker rods end for end, repeat stations for machining the second end are located in horizontally and axially displaced relation to the stations for machining the first end so that only minor axial repositioning and reclamping of each sucker rod is required between machining stations for each end.

BRIEF DESCRIPTION OF THE DRAWINGS

FIG. 1 is a schematic plan view of a sucker rod machining system in accordance with the present invention employing single rough turning, finish turning and threading stations for each end of the sucker rod;

FIG. 2 is a side elevation of one end of the sucker rod as finish machined with rolled thread;

FIG. 3 is a sectional view of the square clamp engaged cross section taken along the line 3—3 of FIG. 2;

FIG. 4 is a schematic plan view of an alternative machining system employing a pair of rough turning, a pair of finish turning and single threading stations;

FIG. 5 is a schematic sectional end view of the fixture drive employed in transporting the sucker rods;

FIG. 6 is a plan view of a typical station for effecting automatic registry of a fixturized pallet for a machining operation;

FIGS. 7A and 7B are fragmentary broken elevations taken along the lines 7A–7B of FIG. 6;

FIGS. 8–14 are respective enlarged sectional views taken along the lines 8—8 to 14—14 of FIG. 6;

FIG. 15 is an end elevation of a typical fixturized pallet assembly;

FIG. 16 is a plan view of the pallet assembly shown in FIG. 15 with fixture omitted;

FIG. 17 is a side elevation of the pallet assembly shown in FIG. 16;

FIG. 18 is an enlarged plan view of the load and fixture clamping station shown in FIG. 1;

FIG. 19 is an elevation taken along the line 19—19 of FIG. 18;

FIG. 20 is an elevation view taken along the line 20—20 of FIG. 18;

FIG. 21 is an enlarged plan view of the clamping fixture assembly shown in FIG. 18;

FIG. 24 is an elevation taken along the line 24—24 of FIG. 22;

FIG. 25 is an elevation taken along the line 25—25 of FIG. 22;

FIG. 26 is an enlarged plan view of the roll thread, gauge and unclamp station shown in FIG. 1;

FIG. 27 is an elevation taken along the line 27—27 of FIG. 26; and

FIG. 28 is an elevation taken along the line 28—28 of FIG. 26.

With reference to FIG. 1 a first embodiment of the sucker rod machining system of the present invention is schematically illustrated in a plan view showing a first horizontal fixturized pallet conveyor 30 passing a load and fixture clamping station, adjacent rough and finish turning stations, a thread, gauge and unlock station and a pallet reposition and unload station. A tailstock conveyor 31 is adapted to cooperate with conveyor 30 in transporting individual sucker rods horizontally disposed across the two conveyors to the successive stations. A return path 32 for fixturized pallets and 33 for tailstock V-blocks is provided by the respective conveyors. The system for machining the first end of the sucker rod generally indicated as 34 is duplicated in a second system 35 for machining the other end so arranged as to permit simple transfer without reversing the position of the second end to be machined.

Figure 7A:
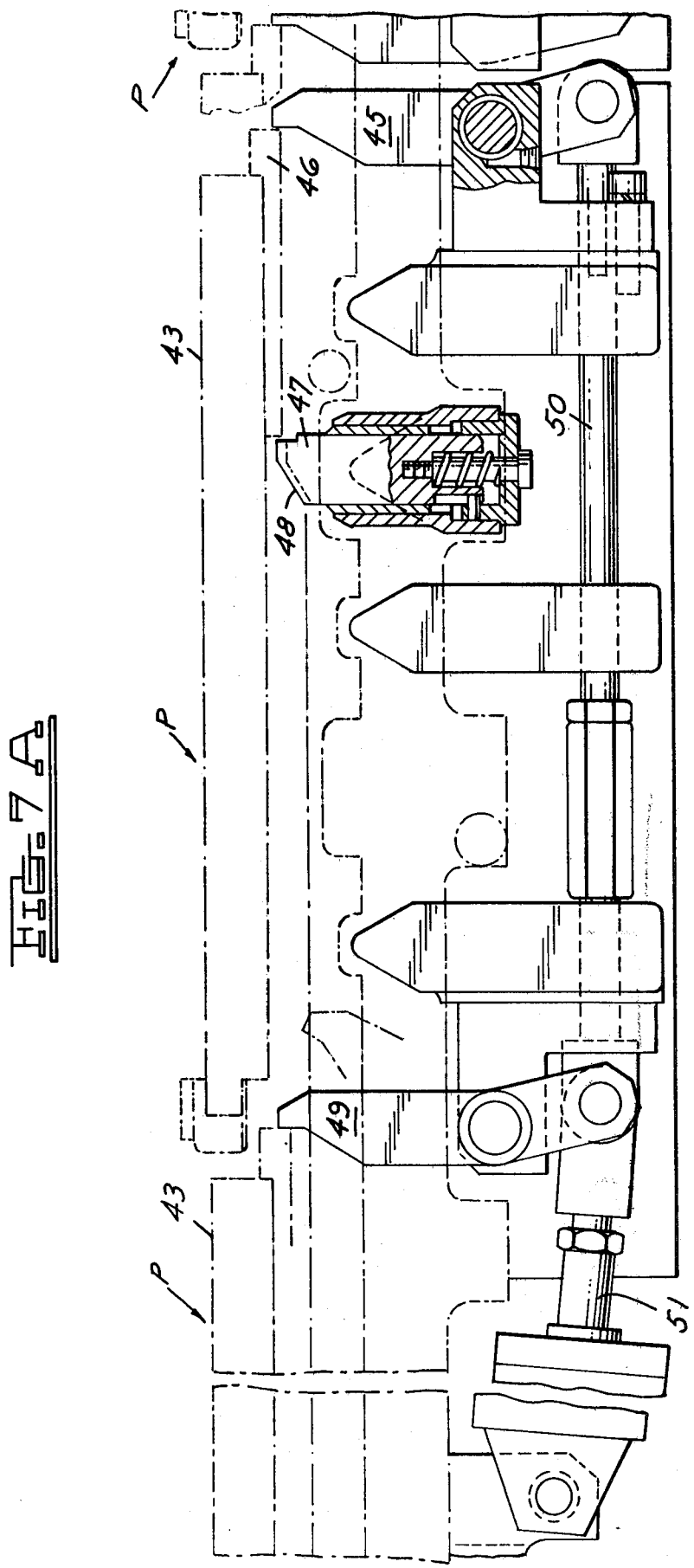

A typical end of sucker rod SR as illustrated in FIGS. 2 and 3 comprises a cylindrical rod portion 36 a forged square cross-section clamp engaged portion 37, a forged annular flange 38 having an accurately machined face 39 extending exactly at right angles to axis 40 of roll threaded end 41 terminating at reduced cylindrical necked portion 42. A coupling (not shown) for joining two identically machined ends of adjacent sucker rods is provided with a through thread terminating in ends exactly normal to the axis which tightly engage each shoulder 39 in assembled relation and must bear with substantially uniform pre-stressed compressive engagement over the full shoulder surface in order to meet American Petroleum Institute standards established to minimize possibilities of any play developing which could result in the coupling working loose during cyclical operation or in developing overstressed fatigue failures through slightly cocked engagement. Thus, very close to absolute precision is required in the normality of shoulder 39 relative to thread axis 40 as the prime objective of the entire machining system.

Since rough forged square cross section surfaces are involved in clamping the workpiece for machining, any release and reclamping at successive stations offers the potential for slight misalignment of the axis angle and-/or displacement relative to previously machined surfaces with a resultant light cocking of shoulder surface 39 with the adjacent threaded coupling end. In addition the use of shoulder 39, initially a rough forged surface, for gauging the axial position of the sucker rod for each machining operation offers the possibility of variations in axial location from operation to operation leading to objectionable variations in the threaded ends as well as occasional gross mislocations leading to scrapped rods. The significant improvement of the present system in securely clamping the end of the sucker rod to be machined in a fixture rigidly mounted on a precisely machined pallet capable of accurate registry and rigid clamping at each successive machining station will now be described.

With reference to FIG. 6 illustrating a station for automatic registry of a pallet for rough turning operation on successive sucker rods and with reference to FIGS. 7A and 7B illustrating longitudinal stops for arresting successive pallets at respective longitudinal positions 43 and 44, retractable stop lever 45 is engageable with leading depending pallet projection 46 trapped against rebound by spring loaded deflectable plunger 47 having ramp surface 48 to accommodate passage of the pallet to a trapped position. Similar simultaneously retractable stop 49 serves to prevent any overtaking successive pallet 50 from entering the station until both stops 45 and 49 are retracted through common linkage 50 actuated by cylinder rod 51. With leading and back stops 52 and 53 retracted by similar linkage 54 and piston rod 55, a pallet in position 43, when released by retraction of step 45, may advance to a position for leading projection 56 to pass stop 53 whereupon restoration of stop 52 to the position shown will effectively stop and trap the pallet in position 44 as shown. The stop mechanism illustrated in FIGS. 7A and 7B accomplish an approximate longitudinal positioning of each fixturized pallet relative to an operating station within limits accommodating precision location and clamping of the pallet by supplemental registry means.

Figure 10:
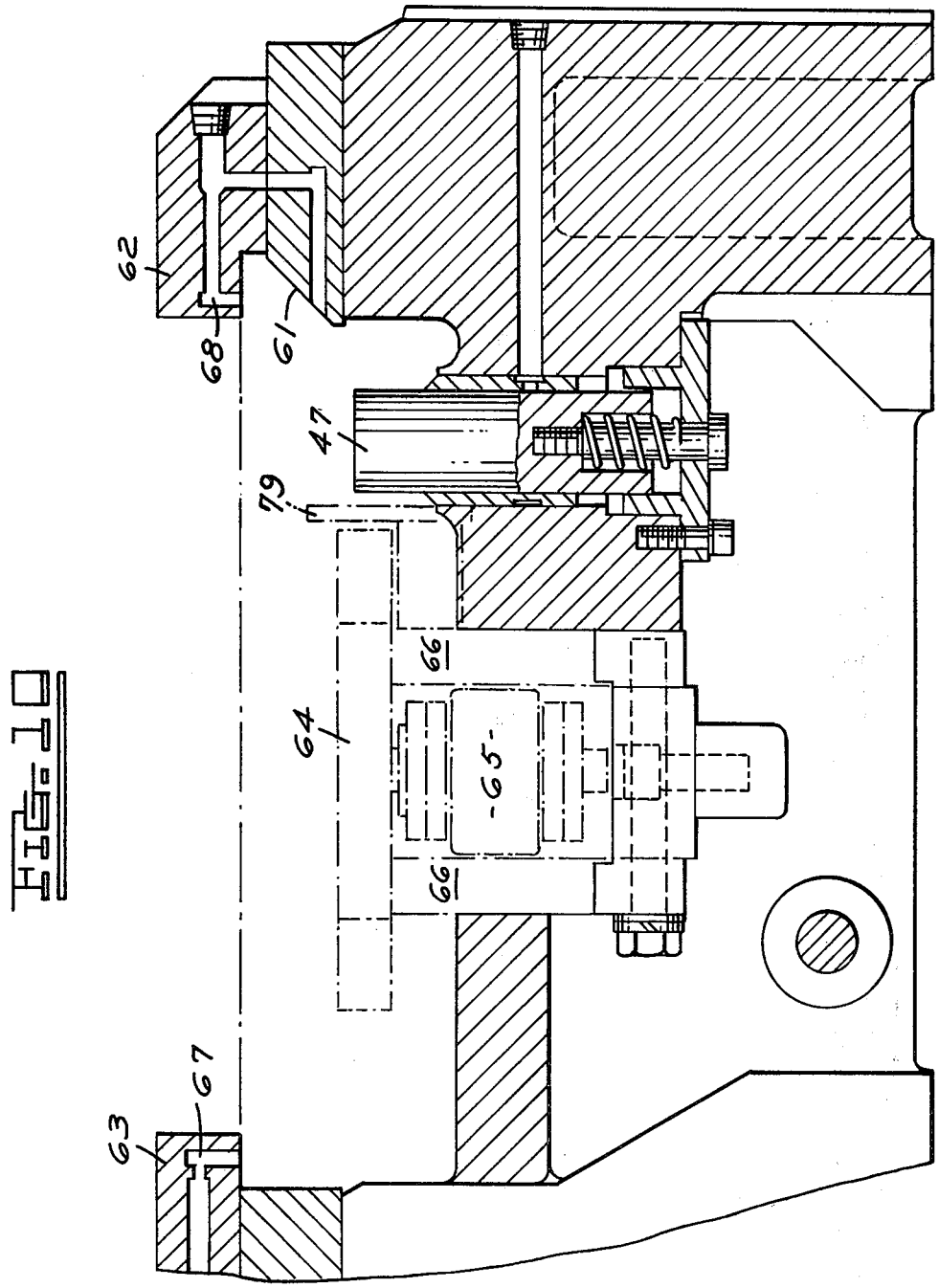

With reference to FIG. 8, a station for locating each pallet includes housing 56 for vertical register pin 57 actuated by retraction of rod extension 58 pulled by power cylinder 59 into pallet locating and clamping position shown which, as later described with reference to the pallet illustrated in FIGS. 15, 16 and 17 serves to center, laterally shift and raise the pallet as shown at 60 in FIG. 9 into accurately clamped position against ramp surface 61 and rigidly fixed clamp rail 62 on one side and clamp rail 63 on the other side. Pallets are transported by frictional engagement to such station position on horizontal conveyor plates 64 at the top of roller drive chain 65 traveling between fixed guide rails 66. FIG. 10 provides a sectional view showing provision of air passages 67, 68 for blowing off any chips on the surface of the incoming pallet to further assure accurate registration.

For control purposes to signal a pallet in registered position, pin 69 projecting from the bottom of the pallet engages button 70, as shown in FIG. 13, actuating linkage 71 for rotating rod 72, lever 73 and limit switch 74 shown in FIGS. 11 and 12 remote from chips and coolant which would provide an adverse environment for a more directly actuated limit switch. With reference to FIGS. 8 and 14 additional controls signal the operation of register pin 57 through linkage 75 from rod extension 58 to adjustable cam 76 for actuating limit switch 77.

With reference to FIGS. 15, 16 and 17 pallet assembly P having fixture F rigidly mounted thereon rides on conveyor plates 64 driven by roller conveyor chain 65 and is provided with guide rollers 78 for engaging fixed guide rail 79, beveled edge 80 for engaging station ram surface 61, machined pad surfaces 81 for registration with bottom surface 82 of clamp rail 62, machined pad surfaces 83 for engaging bottom surface 84 of clamp rail 63, angular beveled engagement surface 85 for receiving machining end of clamping pin 57 shown in FIG. 8 and registration pad 85a (FIG. 16) secured to the bottom of the pallet.

With reference to FIGS. 6, 8, 9, and 16 it will be understood that the matching angular beveled surface at the end of clamping pin 57 will (1) create a backward longitudinal force moving vertical transverse surface 8b of pallet registration pad 85a against vertical transverse locating surface 85c of clamping pin 57; (2) create a transverse force wedging the pallet laterally against ramp surface 61 into clamped engagement of pallet pads 81 with bottom surface 82 of clamp rail 62; and (3) force pallet pads 83 directly upwardly into engagement with bottom surface 84 of clamp rail 63, thus fully and precisely orienting and rigidly clamping the pallet with the single vertical movement of clamping pin 57.

With reference to FIGS. 18 to 21 fixture assembly F for holding an end 86 of sucker rod SR is rigidly mounted on pallet P which moves into the loading and clamping station shown in FIGS. 18, 19 and 20 where it is accurately positioned by station clamping means previously described. During movement into the station clamp setting head 87 is retracted by piston 88 under control of binocular guide rods shown in phantom at 89, and end gauge 90 carried by clamping head 87 is likewise retracted. With fixture F clamped into position, power cylinder 91 moves piston rod 88, head 87 and gauge 90 into full line position shown in FIG. 19 whereupon sucker rod SR is manually or otherwise loaded on V-blocks 92 and 93, clamping arms 94 of the fixture being held open by springs 95, and end shoulder 39 of sucker rod 86 is moved into registration with gauge 90 whereupon slotted clamp setting tools 96, best shown in FIG. 20, engage projections 97 and through opposite screw drives in gear boxes 98 actuated by hydraulic motor 99 move clamp jaws 100 into clamping engagement with square necked portion 101 of sucker rod SR. Clamp retaining wedges 102 are next actuated into holding position by power cylinders 103 and piston rods 104 whereupon clamping head 87 is again retracted and fixturized pallet released for travel to the first machining station.

Figure 22:
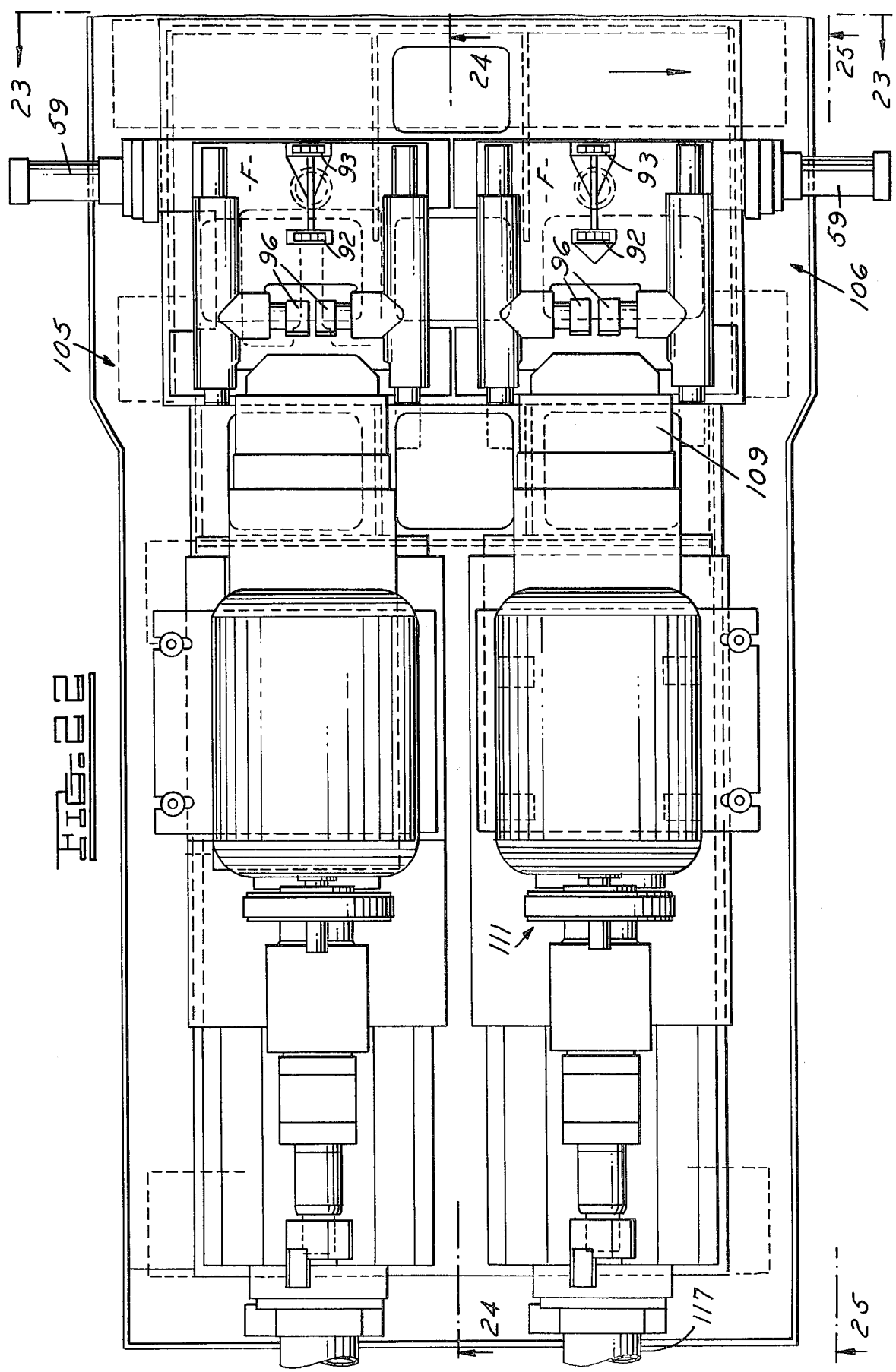
FIG. 22 is an enlarged plan view of the dual rough and finish turning stations illustrated in FIG. 1.
Figure 23:
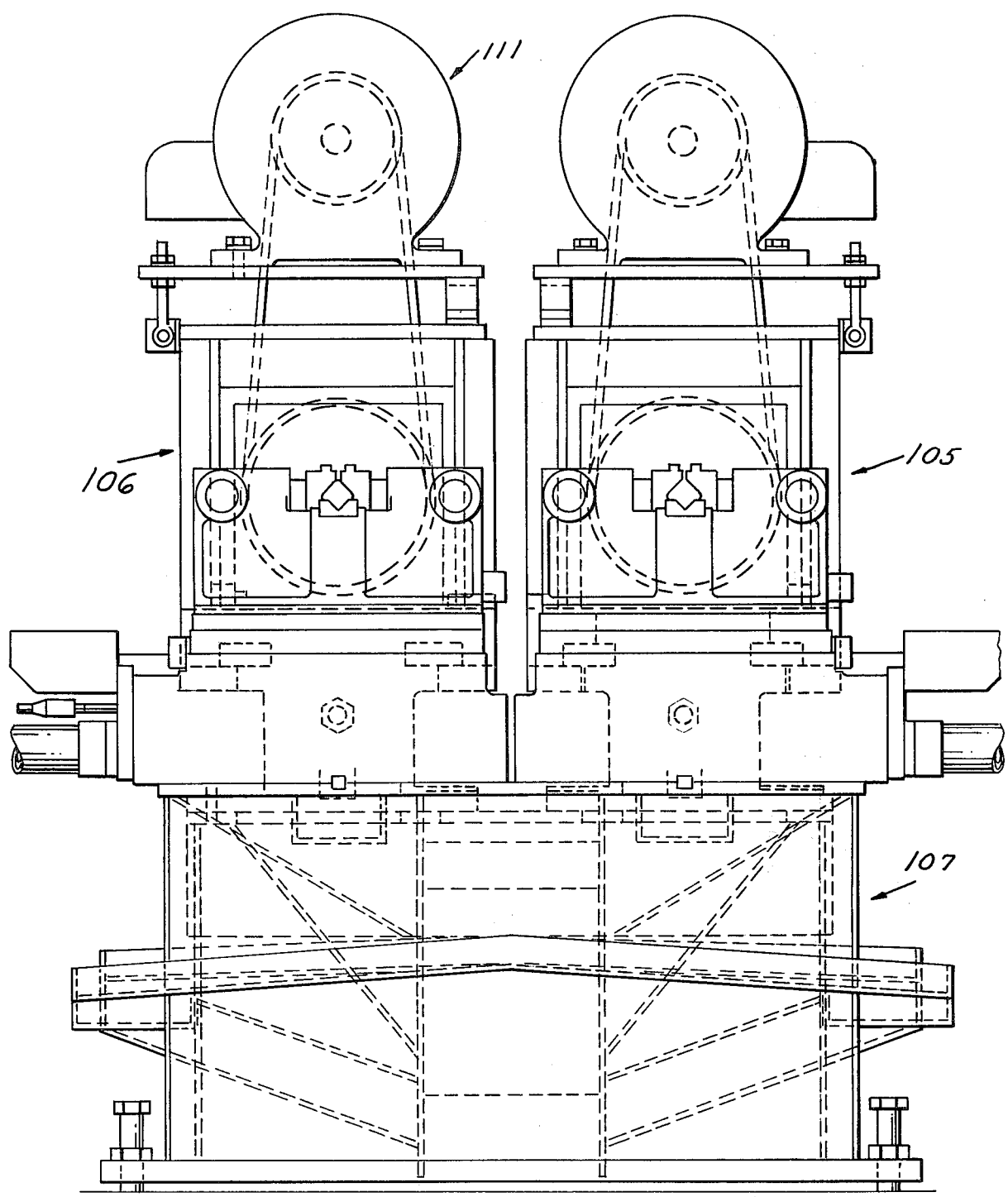
FIG. 23 is an elevation taken along the line 23—23 of FIG. 22.

With reference to FIGS. 22 and 23 rough and finish turning stations 105 and 106 are mounted on common base 107 where a pair of successive fixturized pallets can be located for successive rough and finish machining operations in accordance with the disclosure of FIGS. 6 to 17.

With reference to FIGS. 24 and 25 similar rotating turning heads 108 and 109 driven by motor and belt drives 110 and 111 are mounted on slides 112 and 113 actuated after arrival and clamping of a rod fixturized pallet to an operating position as shown. At the rough turning station separate tools fed within rotating head 108 turn the annular flange 38 (FIG. 3), the adjacent chamfer, end shoulder 39, and the cylindridal end extending from shoulder 39. At the finish turning station, separate finish tools fed within rotating head 109 finish shoulder 39, finish turn the projecting end for the roll threading diameter, and under the axial control of an auxiliary feed rod 115 actuated by hydraulic motor 117 turn the reduced cylindrical necked portion 42.

With reference to FIGS. 26, 27 and 28 each fixturized pallet with clamped rod end next moves to the thread rolling station and rigidly located without intermediate rod release. Prior to completion of the thread rolling operation, gauge 19 verifies the accuracy of the preceding operations whereupon the thread rolling head 114 of station assembly 118 advances to roll the thread and retracts to clearance position. and clamp release levers 120 are actuated by power cylinders 121 to drive release extensions 122 of the clamp wedges into release position 123. Upon retraction of the clamp wedges positive release of clamp jaws 94 is effected by vertical slide 124 having tapered sides 125 for engaging matching tapers on clamp jaws 100 having tapered sides 125 for engaging matching tapers on the clamp jaws 100, slide 124 being actuated by cylinder 126. The unclamped fixturized pallet with rod supported in V-blocks is finally released to an unload station for manual or other removal to the second end machining system 35.

In the duplicate system 35 the same accommodation of different length sucker rods may be provided so that the only variation in the processing of different length rods will be variations in the distance of axial shifting in transferring between the first and second end segments of the total system.

With reference to FIGS. 4 and 5 illustrating the higher capacity embodiment, load and clamp station 127 is the same as in the first embodiment. A pair of roughing stations 128 will be programmed to bypass a fixturized pallet to the second roughing station when both are empty so that the next fixturized pallet may enter the first roughing station while the second is operating; likewise a pair of finish turning stations 129 will provide double capacity with the relatively faster single thread rolling station 130 adapted to handle the output of the dual roughing and finishing stations.

FIG. 5 will be seen to illustrate the angular relationship of sucker rod SR to accommodate overpassing the return flight of the horizontal conveyor with respect to both the main fixturized pallet and the supplemental V-block conveyor. It will also be seen that by locating the support V-block inboard of the shortest sucker rod to be handled by the system a variety of lengths can be accommodated.

We claim:

1. Sucker rod machining system comprising a plurality of aligned spaced machining stations for performing sequential machining operations, rotatable tooling aligned at one side of each station for performing a machining operation on one end of a sucker rod while it is held stationary at said station, fixturized pallet conveyor means extending past said stations, fixturized pallet means transportable from station to station by said conveyor means, clamp means on each fixturized pallet for rigidly holding said sucker rod end without release throughout the succession of machining operations, accurate pallet locating and clamping means at each machining station for rigidly holding the end of the sucker rod to be machined in fixed accurately oriented position with the end and axis of the rod precisely located relative to and extending laterally away from the other side of each station's tooling, and supplemental conveyor means for transporting and supporting the other end of said sucker rod during transport and machining of said one end, each of said conveyor means and supplemental conveyor means comprising a closed loop conveyor, and each sucker rod being angularly positioned relative to the plane of said loop to override and clear the return path of each conveyor means.

2. The machining system of claim 1 wherein the plane of said loop is horizontal.

3. The machining system of claim 2 wherein said conveyor means comprises a continuously running friction drive chain for transporting said fixturized pallet means to each of said machining stations and then back to the beginning of the system and wherein each machining station includes means for arresting the travel of said fixturized pallet means preparatory to said accurate location and clamping.

4. Sucker rod machining system comprising a plurality of aligned spaced machining stations for performing sequential machining operations, rotatable tooling aligned at one side of each station for performing a machining operation on one end of a sucker rod while it is held stationary at said station, fixturized pallet conveyor means extending past said stations, fixturized pallet means transportable from station to station by said conveyor means, clamp means on each fixturized pallet for rigidly holding said sucker rod end without release throughout the succession of machining operations, accurate pallet locating and clamping means at each machining station for rigidly holding the end of the sucker rod to be machined in fixed accurately oriented position with the end and axis of the rod precisely located relative to and extending laterally away from the other side of each station's tooling, supplemental conveyor means for transporting and supporting the other end of said sucker rod during transport and machining of said one end, a clamping station with means for arresting and locating said fixturized pallet means for loading and clamping of the sucker rod and with automatic means for setting said clamp means on each fixturized pallet, and means for releasing said fixturized pallet for conveyance to the first machining station.

5. Sucker rod machining system comprising a plurality of aligned spaced machining stations for performing sequential machining operations, rotatable tooling aligned at one side of each station for performing a machining operating on one end of a sucker rod while it is held stationary at said station, fixturized pallet conveyor means extending past said stations, fixturized pallet means transportable from station to station by said conveyor means, clamp means on each fixturized pallet for rigidly holding said sucker rod end without release throughout the succession of machining operations, accurate pallet locating and clamping means at each machining station for rigidly holding the end of the sucker rod to be machined in fixed accurately oriented position with the end and axis of the rod precisely located relative to and extending laterally away from the other side of each station's tooling, and supplemental conveyor means for transporting and supporting the other end of said sucker rod during transport and machining of said one end, each station including rigid side edge pallet registration means, retractable stop means, and anti-rebound trapping means.

6. The machining system of claim 6 wherein each station includes pallet pressure detecting means for initiating control of the pallet clamping means.

7. The machining system of claim 6 wherein each station includes pallet clamping detection means for controlling the initiation of the machining operation.

8. The machining system of claim 1 adapted to accommodate sucker rods of different lengths wherein said supplemental conveyor means for transporting and supporting the other end of said sucker rod includes support means inboard of said other end.

9. The machining system of claim 8 including a duplicate adjacent machining system for machining the other end of sucker rods transferred from the first end machining system.

* * * * *